United States Patent [19]

Fitzpatrick

[11] Patent Number: 4,484,176

[45] Date of Patent: Nov. 20, 1984

[54] RUN LENGTH LIMITED DATA ENCODER

[75] Inventor: William B. Fitzpatrick, Westminster, Colo.

[73] Assignee: Storage Technology Corporation, Louisville, Colo.

[21] Appl. No.: 444,158

[22] Filed: Nov. 24, 1982

[51] Int. Cl.³ .......................................... H03K 13/24
[52] U.S. Cl. ............................. 340/347 DD; 360/40
[58] Field of Search ................. 340/347 DD; 360/39, 360/40, 41, 42

[56] References Cited

U.S. PATENT DOCUMENTS

| | | | |
|---|---|---|---|
| 3,689,899 | 9/1972 | Franaszek | 340/347 DD |
| 3,995,264 | 11/1976 | Ouchi | 340/347 DD |
| 4,115,768 | 9/1978 | Eggenberger | 340/347 DD |
| 4,413,251 | 11/1983 | Adler | 340/347 DD |

Primary Examiner—C. D. Miller
Attorney, Agent, or Firm—Woodcock Washburn Kurtz Mackiewicz & Norris

[57] ABSTRACT

An improved circuit for encoding data to be stored according to a 2,7 run-length limited code is disclosed, which features substantial simplification compared with prior art circuitry. The simplified circuit uses half as many memory elements as the prior art circuit and employs Boolean identities to simplify the logic elements encoding the data. In a preferred embodiment, the circuit is implemented using emitter-coupled logic. If necessary, the capacitance required by resistor-capacitor networks used to eliminate race conditions may be formed between a planar conductor on one side of a circuit board on which the circuit is laid out and a circuit element on the other.

8 Claims, 5 Drawing Figures

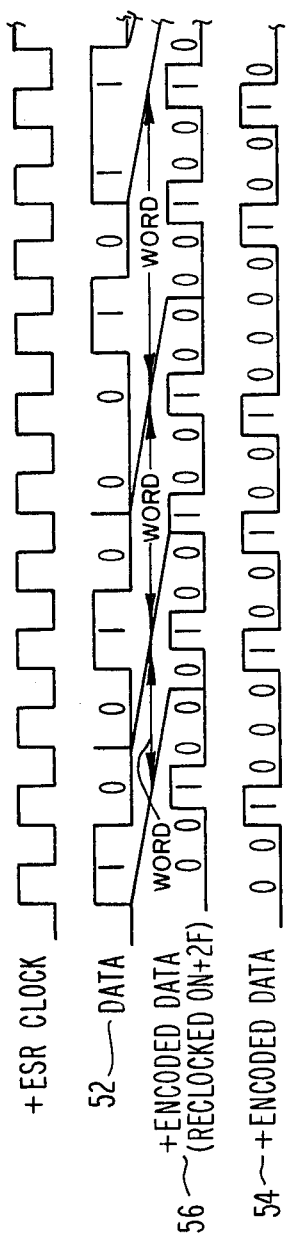

Fig. 3A

+ENCODED DATA = (+ESR CLOCK)·(BD̄)+(−ESR CLOCK)·(B̄D)

$$Y = \overline{A}C\overline{D}\overline{E} + B\overline{D}$$
$$+ESR\ CLOCK$$
$$+(-ESR\ CLOCK)\cdot(\overline{A}B\overline{E}+BC\overline{E})$$

PRIOR ART →

+ENCODED DATA = (+ESR CLOCK)·(D̄H)+(−ESR CLOCK)·(DH̄)

$$Y = B\overline{F}\overline{H}\overline{J} + D\overline{F} + D\overline{H}$$
$$+ESR\ CLOCK$$
$$+(-ESR\ CLOCK)\cdot(\overline{A}C\overline{I}+CE\overline{I})$$

RUN LENGTH LIMITED DATA ENCODER

FIELD OF THE INVENTION

This invention relates to electronic circuitry for encoding of digital data to be stored on a magnetic storage medium such as a disk drive. More particularly, the invention relates to simplified circuitry for encoding digital data according to a so-called 2,7 run length limited code.

BACKGROUND OF THE INVENTION

It has been known for some time that the efficiency of storage of digital data on magnetic storage media such as a disk drive can be improved if the data is encoded prior to storage. The code generally used is such that the magnetic flux transitions written to the disk are encoded versions of the data written and do not correspond directly to the data. One such code which is in common use is the 2,7 run length limited code which is described in U.S. Pat. No. 3,689,899 issued to P. A. Franaszek. According to the Franaszek patent, incoming data is scanned and specified patterns found in the data are converted in corresponding patterns of encoded ones and zeroes. According to this code, twice as many encoded bits are generated as data pulses are encoded. However, when the data is thereafter written to the disk, only the ones are written as magnetic flux transitions. This permits the encoded flux transitions to be written closer together, resulting in a net improvement in the amount of data which can be stored on a given disk. The encoded zeroes are represented by absences of flux transitions, i.e., the space between adjacent flux transitions written to the disk is controlled by counting of clock pulses supplied at a fixed frequency. Upon reading the number of clock pulses counted between adjacent flux transitions is converted to a like number of zeroes between the ones represented by the flux transitions. The recovered encoded data can then be decoded, again according to the Franaszek patent.

Circuitry for performing such encoding and decoding is shown in U.S. Pat. No. 4,115,768 to Eggenberger et al. Such circuitry is in wide use in the data storage industry and is not without utility. However, it has been realized by the present inventor that it is unnecessarily complex and that a substantial hardware reduction can be made without impeding the circuit function.

OBJECTS OF THE INVENTION

Accordingly, it is an object of the invention to provide a simplified encoder for run length limited coding of data to be stored on a magnetic storage medium such as a disk drive.

It is a further object of the invention to provide an encoder of improved function, having a simplified and hence more reliable circuit than those in the prior art.

An ultimate object of the invention is to provide a less expensive, simpler and more reliable data encoding circuit than in the prior art.

SUMMARY OF THE INVENTION

The above needs of the art and objects of the invention are satisfied by the present invention, according to which the circuit shown in the prior art patent to Eggenberger referred to above is greatly simplified by elimination of superfluous logic operations. In a preferred embodiment, the number of flip-flops used is cut substantially in half as compared to the Eggenberger circuit, while the number of discrete logic gates is also reduced substantially. The circuit is capable of operation at significantly higher data rates than the Eggenberger circuit.

BRIEF DESCRIPTION OF THE DRAWINGS

The invention will be better understood if reference is made to the accompanying drawings, in which.

DESCRIPTION OF THE PREFERRED EMBODIMENTS

For ease in understanding of the present invention, the data patterns which are recognized and encoded by the encoding circuit of the invention and the encoded versions thereof, referred to above, are reproduced as Table I.

TABLE I

| DATA WORDS | CODE WORDS |
| --- | --- |
| 10 | 0100 |
| 010 | 100100 |
| 0010 | 00100100 |
| 11 | 1000 |
| 011 | 001000 |
| 0011 | 00001000 |
| 000 | 000100 |

Those skilled in the art will recognize that any desired combination of data to be stored can be generated from the data words listed in the left-hand column of Table I.

It will be noted from examination of Table I that the code words are twice as long as the data words, but avoid the occurrence of 1's next to one another. In fact, according to the 2,7 "rules" of the code, any two adjacent flux transitions written to a disk representing 1's in the code words may be separated from one another by no less than two zeroes nor by more than seven zeroes. The written zeroes are counted upon later reading by comparison of the code words to a clock circuit. When a clock pulse goes by without a flux transition being detected on the disk, a zero is inserted in the stream of encoded data supplied to the decoding circuitry used, while the flux transitions are translated as ones. The "recovered" data can then be decoded; suitable decoding circuitry is fully described in the Eggenberger patent with reference to FIGS. 6-8 thereof.

Figure 1:
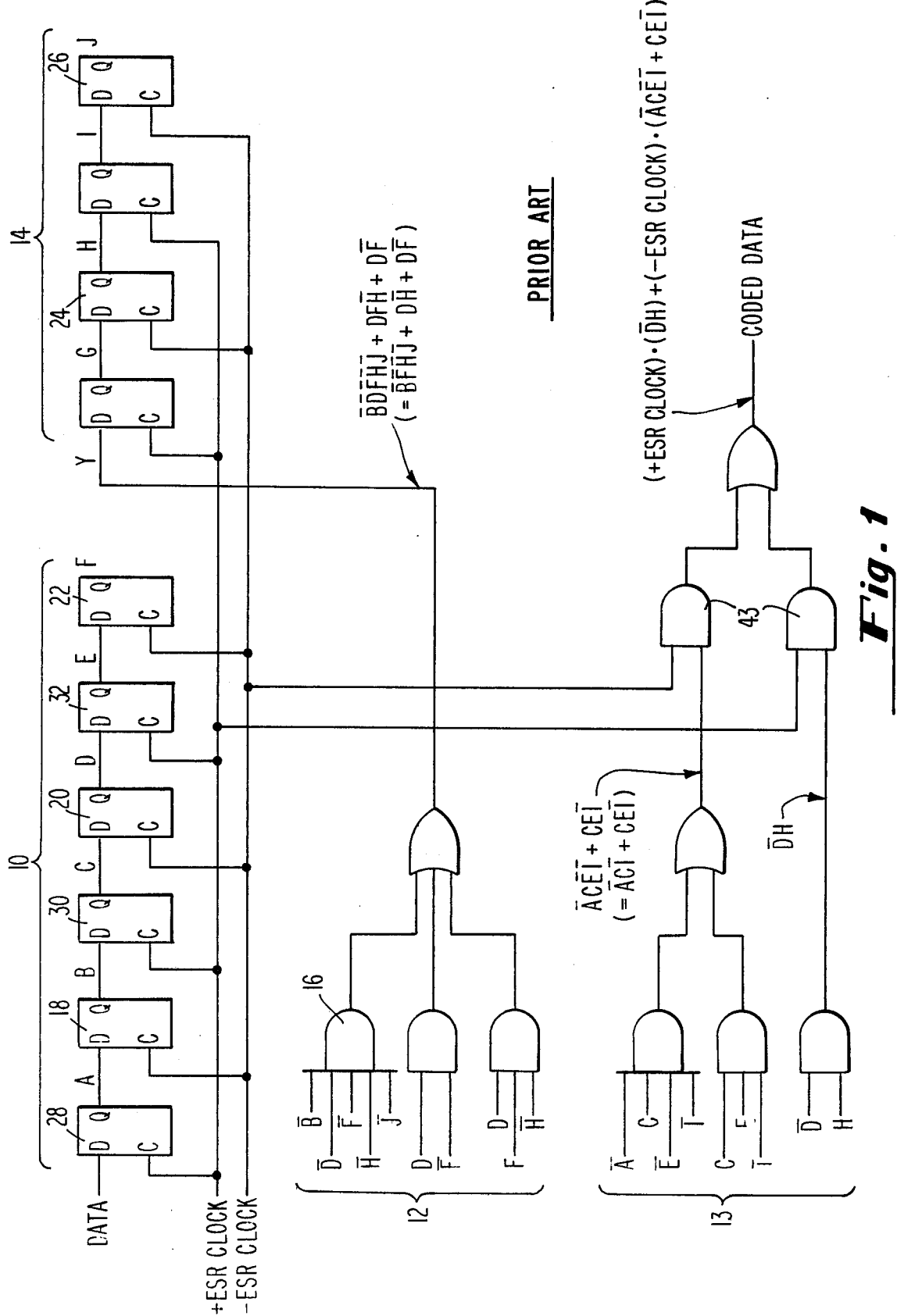
FIG. 1 shows the prior art embodiment found in the Eggenberger patent.

Encoding circuitry for conversion of the data words on the left-hand column of Table I into the code words is the area with which the present invention is concerned. The prior art circuitry is shown in FIG. 1. This is essentially the same circuit shown in FIG. 3 of the Eggenberger patent. First and second series of flip-flops 10 and 14, operating as shift registers, are provided, and their outputs are linked to two groups of combinational logic gates indicated generally at 12 and 13. The output of gates 12 is supplied to the second series of flip-flops 14, as input, while the data to be encoded is the input to the first series 10. It will be appreciated by those skilled in the art that the flip-flops of groups 10 and 14 are used as memory elements in this circuit because the data word cannot be fully encoded until its end is detected, i.e., it is essential to locate the end of a data word before one can properly encode it. The combinational logic circuitry shown generally at 12 and 13 performs this function.

Figure 3B:
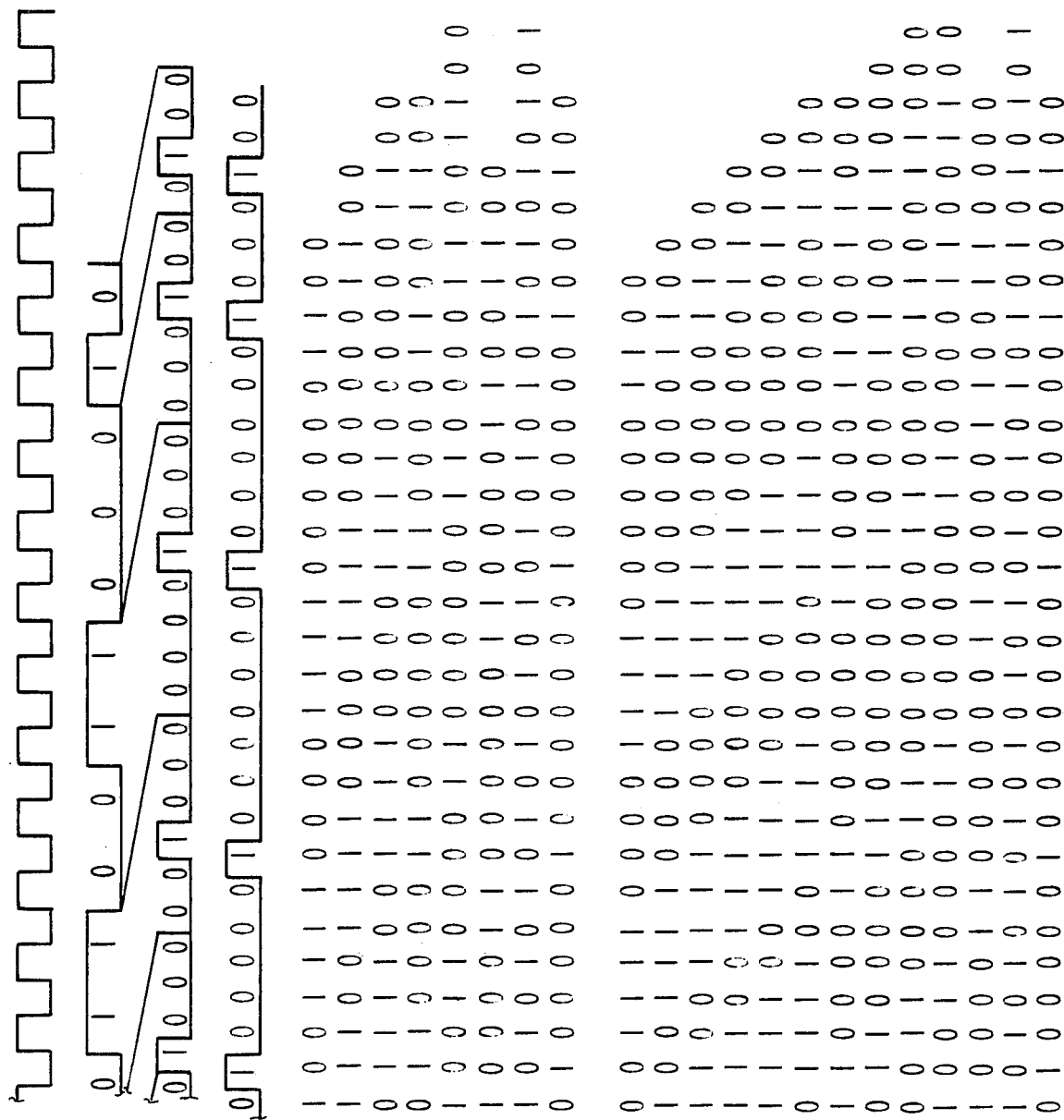
FIG. 3 gives examples of encoding data by showing the signals at various points in the circuits of FIGS. 1 and 2.

It will be appreciated from a comparison of FIG. 1 with FIG. 3 of the Eggenberger patent that the lines connecting the flip-flops 10 to the logic gates 12 are not drawn in FIG. 1 of the present application, simply for clarity's sake. Instead, the outputs of the flip-flops are shown as signals A through J, and these letters identify the inputs to the combinational logic gates, as shown. Thus, for example, AND gate 16 has as its inputs $\overline{B}$, $\overline{D}$, $\overline{F}$, $\overline{H}$ and $\overline{J}$. These are the inverted outputs of every other one of the groups of flip-flops 10 and 14. B, D and F are the output signals respectively from flip-flops 18, 20 and 22 from the first group 10, while H and J are the outputs from flip-flops 24 and 26 of the second group 14. Positive and inverted versions of the same clock signal "ESR CLOCK" are supplied to alternate ones of the flip-flops in groups 10 and 14.

While the flip-flops are paired, according to the Eggenberger disclosure, i.e., flip-flop 28 with 18, 30 with 20, 32 with 22, and so on, outputs from each one of each pair of flip-flops are used for the encoding according to Eggenberger, so that it is not apparent that, in fact, redundant circuit elements are present. However, inspection of the gating combinations made indicates that in each case the outputs from each flip-flop change on the rising edge of the clock pulse provided by ±ESR CLOCK, but no effect on the encoding occurs until the clock pulse goes low again. Accordingly, while the flip-flop outputs change on alternate clock pulses, they are not used then, which allow the circuit to be simplified. Moreover, if outputs A, C, E, G and I are delayed half a clock period, but enabled as in the Eggenberger patent, i.e. upon raising of the following clock pulse, the outcome is unchanged. This indicates that half the flip-flops can be eliminated.

Figures 2, 4:
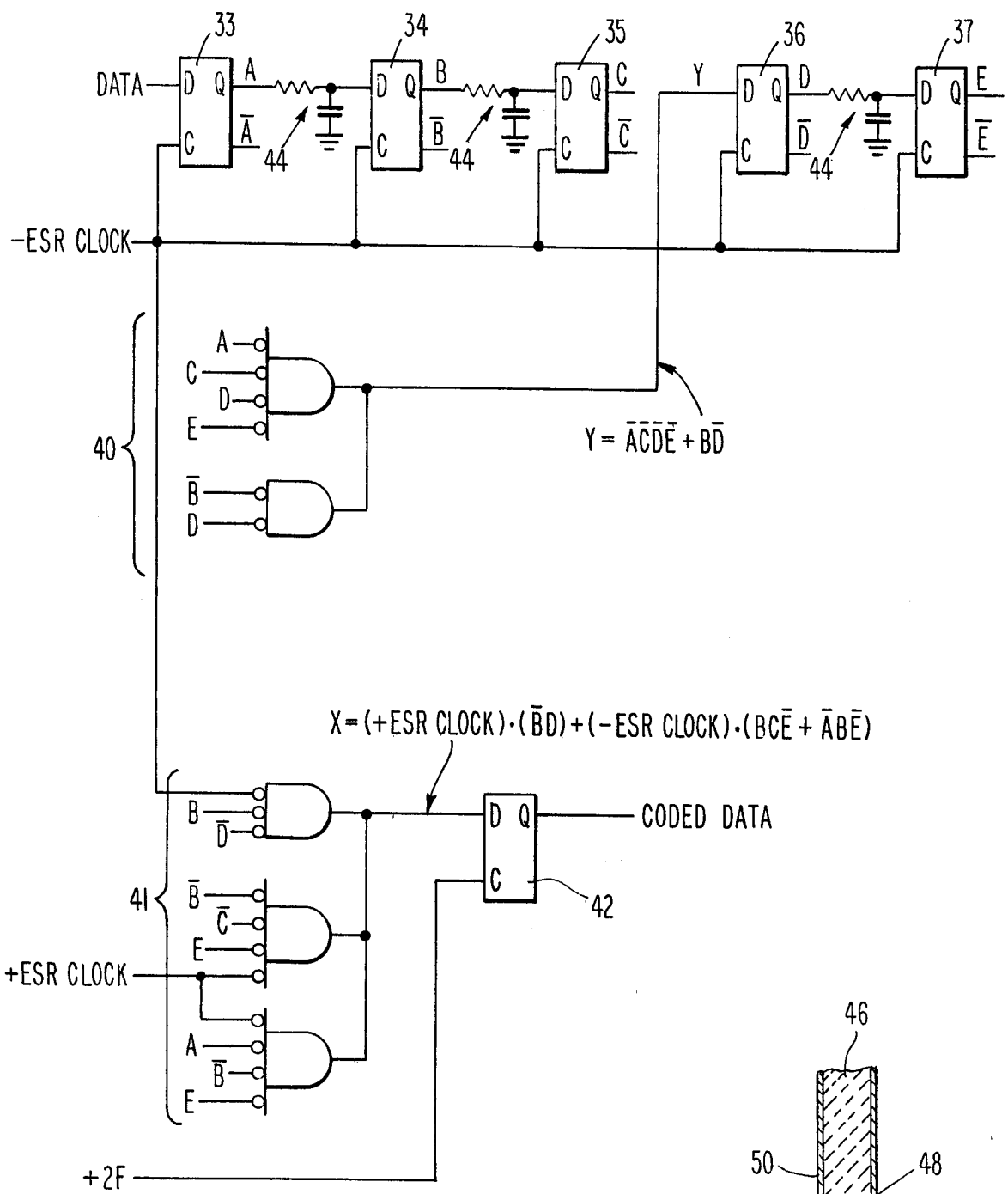
FIG. 2 shows a corresponding schematic diagram of the circuit according to the present invention.
FIG. 4 shows a cross-sectional view of a portion of a circuit board.

FIG. 2 shows an embodiment of the invention where simplification has been achieved. Note that only five flip-flops, numbered 33 through 37, replace the ten flip-flops shown in the Eggenberger reference. Their output signals A through E are generally equivalent to the signals B, D, F, H and J of Eggenberger and are inputs to combinational logic elements 40 and 41 which is also generally equivalent in function, though not in actual circuit design, to arrays 12 and 13 shown by Eggenberger. Again, the combinational logic 40 and 41 uses all the outputs of the flip-flops 33–37. The inverted inputs to the logic elements, e.g. $\overline{A}$, may simply be the inverse outputs of the flip-flops 33–37, which are conventionally provided, i.e., $\overline{A}$ does not necessarily indicate a separate inversion operation performed on A. The output Y of the first group of combinational logic 40 feeds the second group of flip-flops 36 and 37, while the output X of the second group 41 is the encoded data stream. The output, on the line marked "Coded Data", is the same for any given input series of data pulses as that obtained by the Eggenberger circuit. Some of the simplification is achieved because there are only half as many flip-flops 33–37 to provide memory locations and accordingly, and logic 40 and 41 need not be as complex.

Further improvements are made using the Boolean identity $AB + \overline{B} = A + \overline{B}$. (As used in this specification and the appended drawings and claims, the notation "A+B" is used to refer to Boolean "A OR B"; "AB" and "A.B" are equivalent to "A AND B"; and "$\overline{A}$" is "NOT A"). For example, the term $(\overline{BDFHJ} + DF\overline{H} + D\overline{F})$, Y in the Eggenberger circuit, can be reduced twice to $(\overline{BFHJ} + D\overline{H} + D\overline{F})$ eliminating two terms. Then the DH term can be eliminated completely, yielding the equivalent $Y = \overline{ACDE} + B\overline{D}$ of applicant's circuit. Similarly the term $(\overline{ACEI} + CE\overline{I})$ can be reduced by one term to $(\overline{ACI} + CE\overline{I})$. The ±ESR CLOCKs are used in the circuit of the invention, as in the Eggenberger circuit. However, applicant supplies the clock signals to the logic gates at the same point as the flip-flops' output signals, eliminating two additional AND gates 43 from the Eggenberger circuit. The output coded data is gated by a sixth flip-flop 42 at the 2F rate, i.e., at twice the data frequency F, in accordance with the rules of the encoding, according to which the coded data pulses are output at twice the rate at which the data to be encoded is input to the first flip-flop 33.

It will be appreciated that one advantage of the paired flip-flops approach according to the Eggenberger circuit is that race conditions, which can occur when the input to a flip-flop changes before the required holding time on the clock signal input has been satisfied, and can lead to data integrity problems, are generally avoided. If it were desired to use a particular kind of flip-flops, in which such a situation might prevail, race conditions may be avoided by including RC networks at 44 between succeeding pairs of flip-flops. In the preferred embodiment, however, the circuit will be implemented using so-called emitter-coupled logic (ECL) components; e.g., employing Signetics Model 10131 D-type flip-flops. The propagation delay of these circuits is 1.7 nanoseconds, and a clock hold time of 1.5 nanoseconds is required. Accordingly, the delay provided by the RC networks 44 is not needed.

Should RC networks 44 be required, however, the present inventor has realized that the capacitors can be discrete or formed by the inherent capacitance between the conductors on the printed circuit board on which the circuit of the invention is realized and the power plane of the printed circuit board. FIG. 4 shows a cross-section of a circuit board in schematic form. The board comprises an insulative substrate 46 which may be made of an epoxy bonded fiberglass material. The conductors forming the circuitry of FIG. 2 would be conductive material 48 bonded to one side of the circuit board 46. Typically, the other side of the circuit board is used for other circuitry such as power supply circuitry as at 50. Those skilled in the art will recognize that a capacitance C typically exists between the power plane 50 and such conductors 48 and that in many cases it can be a nuisance. According to this feature of the invention, the problems well known to be caused by such inherent capacitance are avoided, while further hardware economies are realized.

FIG. 3 shows an example of how an incoming data stream is converted to encoded data according to the rules discussed in the Franaszek patent referred to above. The lower portion of FIG. 3, labeled prior art, shows the signals output by the flip-flops 10 and 14 of the Eggenberger circuit at points A through J, and shows the signal Y which is the result of the operation of the upper portion 12 of the combinational logic in FIG. 1, which is input to the second group of flip-flops 14. The ESR CLOCK pulse train is shown for clarity, as is the output encoded data. The upper portion of FIG. 3 shows the same type of representation of signals in the circuit of the invention shown in FIG. 2, wherein the lines A through E show the outputs of the flip-flops 33-37. Line Y shows the output of the upper portion of the combinational logic 41, as supplied to flip-flop 36, and the ENCODED DATA signal output by the circuit of the invention at flip-flop 42 is also shown. The uppermost portion of FIG. 3 shows the incoming data stream at 52 and the encoded data at 54. The encoded data is also shown at 56, reclocked on the +2F clock frequency, which is desirable for reasons discussed below.

The incoming data stream 52 is shown divided into words by single vertical lines and comprises a series of ones and zeroes. The first three word boundaries are noted on the drawing and are translated according to Table I given above, that is, 10 (line 52) translates to 0100 (lines 54-56), 010 translates to 100100, and so forth, the +ESR CLOCK signal is also shown topmost in FIG. 3.

Testing of the circuit shown in FIG. 2 shows that it is indeed the functional equivalent of the circuit shown in FIG. 1 and produces the same encoded data in response to any given input data pattern.

The Eggenberger patent also shows in FIGS. 6-8 a circuit for decoding data having been stored on a disk for supply to a host computer upon initiation of a read request. Once again Eggenberger shows the use of paired flip-flops. In this case, only the output from the second flip-flop of each pair is ever used by the combinational logic 67 so that one flip-flop can be removed from each pair without affecting the function of the circuit and without modifying the logic circuitry. In a preferred embodiment of a disk drive built according to the invention, this would be the decoding circuitry employed, if a combination of sequenced flip-flops connected as shift registers and combinational logic were to be used as the decoding circuitry. Other decoding circuits are possible.

It will be appreciated by those skilled in the art that according to the Eggenberger circuit, signals must pass through differing numbers of differing types of gates which can lead to erroneous cooling. All the signals in applicant's circuit go through the same number of gates, by elimination of any gates equivalent to Eggenberger's AND gates 43, and all of the gates in applicant's circuit are the same type, i.e., NOR gates. Both these expedients add to reliability. Applicant's circuit also gates the output signal in flip-flop 42, to avoid any "glitches" caused by these or other problems, such as variations in component tolerances.

Those skilled in the art will recognize that there exists a trend in the data storage art toward higher and higher data rates. The present circuit, as noted, is desirably implemented using emitter-coupled logic (ECL). Previous decoding circuitry, such as the Eggenberger circuit, was typically implemented using transistor-transistor logic (TTL) which is not as fast as emitter-coupled logic. The best performance which could be achieved in tests of the circuit shown in FIG. 1 was a data rate of 15 mHz whereas the simplified circuit of FIG. 2 has been successfully tested up to 24 mHz using TTL circuitry, thus demonstrating a substantial speed advantage. An embodiment of the circuit of the invention using ECL circuitry is expected to run at up to 37.5 mHz data rate.

While a preferred embodiment of the invention has been described above, it will be appreciated by those skilled in the art that other embodiments are possible. For example, the embodiment of the invention shown uses NOR gates 40 and 41. AND gates (using the inverse input signals) could be used instead, but at the present time four-input AND gates are not available in ECL circuitry; as ECL circuitry is desirably used, the circuit shown is the preferred embodiment. Accordingly, the invention should not be limited by the above exemplary disclosure, but only by the following claims.

I claim:

1. A circuit for the encoding of a stream of data pulses comprising:

a clock for putting out ±CLOCK signals;

a first group of first, second and third flip-flop circuit elements arranged serially, the first of said flip-flop circuit elements being adapted to receive said stream of data pulses to be encoded, said first, second and third flip-flop circuit elements outputting signals A, B and C, respectively;

first and second groups of combinational logic elements; and a second group of flip-flop circuit elements comprising a pair of sequentially connected flip-flop circuit elements, the first of which is adapted to receive a signal Y from said first group of combinational logic elements and output a signal D to the second one of said pair of flip-flop circuit elements, the second of said pair of flip-flop circuit elements being adapted to output a signal E;

wherein said first group of combinational logic elements is adapted to generate said signal Y, having the Boolean value $A\overline{CDE} + B\overline{D}$, and said second group of combinational logic is adapted to output an encoded data signal X, said signal X being equivalent to the Boolean statement $(+CLOCK) \cdot (\overline{BD}) + (-CLOCK) \cdot (BC\overline{E} + \overline{A}B\overline{E})$.

2. The circuit of claim 1 wherein said combinational logic elements generating said X and Y signals are NOR gates.

3. The circuit of claim 1 wherein resistor-capacitor delay networks are interposed between said three flip-flop circuit elements in said first group and between said two flip-flop circuit elements in said second group to prevent race conditions.

4. The circuit of claim 3 wherein said capacitors are realized using the inherent capacitance between conductors in said circuit and a planar conductor formed on a circuit board on which said circuit is realized.

5. The circuit of claim 1 wherein the first, second and third flip-flop circuit elements of said first group are separated from one another by resistor-capacitor networks and said first and second flip-flop circuit elements of the second group are separated from one another by a resistor-capacitor network.

6. The circuit of claim 5 wherein said circuit is implemented on a circuit board and the capacitors of said resistor-capacitor networks are formed by capacitance existing between circuit elements disposed on one side of said circuit board and planar conductor means disposed on the other side of said circuit board, generally opposite said circuit element.

7. An electronic circuit for converting a stream of incoming data pulses into an encoded version thereof comprising:

a clock for generating a CLOCK signal;

a first group of three flip-flop circuit elements serially connected to one another and adapted to receive said data pulses and output signals A, B and C in response thereto;

a first group of combinational logic elements adapted to output a signal Y based on the inputs to said first group of combinational logic elements;

a second group of two flip-flop circuit elements adapted to receive said signal Y and output signals D and E in response thereto; and a second group of combinational logic elements adapted to receive the signals output by both groups of flip-flop circuit elements and to generate an encoded data signal X based on the inputs to said second series of combinational logic elements and clock signals input thereto;

wherein said first group of flip-flop circuit elements comprises first, second and third flip-flop circuit elements outputting signals A, B and C, respectively, and said second group of flip-flop circuit elements comprises first and second flip-flops outputting signals D and E respectively, and the signal Y output by said first group of combinational logic elements is equivalent to the Boolean quantity $\overline{AC}\ \overline{DE}+B\overline{D}$; and wherein both positive and inverted CLOCK signals are provided and the signal X output by said second group of combinational logic elements is equivalent to the Boolean quantity $(+CLOCK)\cdot(\overline{B}D)+(-CLOCK)\cdot(BC\overline{E}+\overline{AB}\overline{E})$.

8. The circuit of claim 7 wherein said combinational logic elements are NOR gates.

* * * * *